US007305524B2

(12) United States Patent
Hoover et al.

(10) Patent No.: US 7,305,524 B2
(45) Date of Patent: Dec. 4, 2007

(54) SNOOP FILTER DIRECTORY MECHANISM IN COHERENCY SHARED MEMORY SYSTEM

(75) Inventors: Russell D. Hoover, Rochester, MN (US); Eric O. Mejdrich, Rochester, MN (US); Jon K. Kriegel, Rochester, MN (US); Sandra S. Woodward, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 414 days.

(21) Appl. No.: 10/961,749

(22) Filed: Oct. 8, 2004

(65) Prior Publication Data

US 2006/0080508 A1    Apr. 13, 2006

(51) Int. Cl.
*G06F 12/00* (2006.01)
(52) U.S. Cl. .................. 711/133; 711/143; 711/146; 711/144; 345/502
(58) Field of Classification Search ................ 711/133, 711/143, 146, 144, 141, 120, 147, 122
See application file for complete search history.

(56) References Cited

U.S. PATENT DOCUMENTS

| 5,113,514 | A | * | 5/1992 | Albonesi et al. ............ 711/144 |
| 5,291,442 | A | * | 3/1994 | Emma et al. ................ 711/120 |
| 5,581,705 | A | | 12/1996 | Passint et al. |
| 5,841,973 | A | | 11/1998 | Kessler et al. |
| 5,890,217 | A | * | 3/1999 | Kabemoto et al. .......... 711/141 |
| 6,067,611 | A | * | 5/2000 | Carpenter et al. ............ 712/28 |
| 6,078,992 | A | * | 6/2000 | Hum ........................... 711/122 |
| 6,092,173 | A | * | 7/2000 | Sasaki et al. ................. 712/14 |
| 6,124,868 | A | | 9/2000 | Asaro et al. |
| 6,363,438 | B1 | | 3/2002 | Williams et al. |
| 6,449,699 | B2 | | 9/2002 | Franke et al. |
| 6,725,296 | B2 | | 4/2004 | Craddock et al. |
| 6,801,207 | B1 | | 10/2004 | Tischler et al. |
| 6,801,208 | B2 | | 10/2004 | Keshava et al. |
| 6,820,143 | B2 | | 11/2004 | Day et al. |
| 6,820,174 | B2 | | 11/2004 | Vanderwiel |
| 2004/0117592 | A1 | | 6/2004 | Day et al. |
| 2004/0162946 | A1 | | 8/2004 | Day et al. |
| 2004/0263519 | A1 | | 12/2004 | Andrews et al. |

* cited by examiner

*Primary Examiner*—Manlo Padmanabhan
*Assistant Examiner*—Victor W. Wang
(74) *Attorney, Agent, or Firm*—Patterson & Sheridan LLP

(57) ABSTRACT

Methods and apparatus that may be utilized to maintain coherency of data accessed by both a processor and a remote device are provided. Various mechanisms, such as a remote cache directory, castout buffer, and/or outstanding transaction buffer may be utilized by the remote device to track the state of processor cache lines that may hold data targeted by requests initiated by the remote device. Based on the content of these mechanisms, requests targeting data that is not in the processor cache may be routed directly to memory, thus reducing overall latency.

5 Claims, 9 Drawing Sheets

| ENHANCED BUS TRANSACTION BITS/SIGNALS FOR REMOTE CACHE DIRECTORY (ALLOCATION) | |
|---|---|
| BIT/SIGNAL | DESCRITPTION |
| RC_WAY_ALLOC_V (VALID BIT) | 0 (INACTIVE) NEW ENTRY IS NOT BEING ALLOCATED<br>1 (ACTIVE) NEW ENTRY IS BEING ALLOCATED |
| RC_WAY_ALLOC (0:N) (SET_ID) | INDICATES WHICH WAY OF THE SET IS BEING ALLOCATED A NEW ENTRY |
| RC_AGING (AGING BIT) | INDICATES WHETHER AN AGING CASTOUT IS BEING ISSUED (E.G., THE LINE BEING REPLACED WAS MODIFIED) |

FIG. 4A

| ENHANCED BUS TRANSACTION BITS/SIGNALS FOR REMOTE CACHE DIRECTORY (DE-ALLOCATION) | |
|---|---|
| BIT/SIGNAL | DESCRIPTION |
| CPI_WAY_DEALLOC_V | 0 (INACTIVE) NEW ENTRY IS NOT BEING DE-ALLOCATED<br>1 (ACTIVE) NEW ENTRY IS BEING DE-ALLOCATED |
| CPI_WAY_DEALLOC(0:W) | INDICATES WHICH WAY OF THE SET IS BEING DE-ALLOCATED |

FIG. 4B

SNOOP FILTER DIRECTORY MECHANISM IN COHERENCY SHARED MEMORY SYSTEM

CROSS-REFERENCE TO RELATED APPLICATIONS

This application is related to commonly owned U.S. patent applications entitled "Enhanced Bus Transactions for Efficient Support of a Remote Cache Directory Copy" application Ser. No. 10/961,742), "Direct Access of Cache Lock Set Data Without Backing Memory" application Ser. No. 10/961,752), "Efficient Low Latency Coherency Protocol for a Multi-Chip Multiprocessor System" application Ser. No. 10/961,751), "Graphics Processor With Snoop Filter" application Ser. No. 10/961,750), which are herein incorporated by reference.

BACKGROUND OF THE INVENTION

1. Field of the Invention

This application generally relates to data processing systems and, more particularly, to systems in which multiple processing devices may access the same shared data stored in memory.

2. Description of the Related Art

In a multiprocessor system, or any type of system that allows more than one device to request and update blocks of shared data concurrently, it is important that some mechanism exists to keep the data coherent (i.e., to ensure that each copy of data accessed by any device is the most current copy). In many such systems, a processor has one or more caches to provide fast access to data (including instructions) stored in relatively slow (by comparison to the cache) external main memory. In an effort to maintain coherency, other devices on the system (e.g., a graphics processing unit-GPU) may include some type of coherency or "snoop" logic to determine if a copy of data from a desired memory location is held in the processor cache by sending commands (snoop requests) to a processor cache directory.

This snoop logic is used to determine if desired data is contained in the processor cache and if it is the most recent (modified) copy, typically by querying the processor cache directory. If so, in order to work with the latest copy of the data, the device may request ownership of the modified copy stored in a processor cache line. In a conventional coherent system, devices requesting data do not know ahead of time whether the data is in a processor cache. As a result, each device must query (snoop) the processor cache directory for every memory location that it wishes to access from main memory to make sure that proper data coherency is maintained, which can be very expensive both in terms of both command latency and microprocessor bus bandwidth.

Accordingly, what is needed is an efficient method and system which would reduce the amount of latency associated with interfacing with (snooping on) a processor cache.

SUMMARY OF THE INVENTION

Embodiments of the present invention generally provide methods and apparatus that may be utilized to maintain coherency of data accessed by a remote device that may reside in a cache of a processor.

One embodiment provides a method of maintaining coherency of data accessed by a remote device. The method generally includes maintaining, on the remote device, a remote cache directory indicative of memory locations residing in a cache on a processor which shares access to some portion of a memory device and a castout buffer indicating cache lines that have been or will be castout from the processor cache. Memory requests issued at the remote device may be routed to the memory device or the processor cache, depending on information contained in the remote cache directory and castout buffer.

Another embodiment provides a method of maintaining coherency of data accessed by a remote device. The method generally includes maintaining, on the remote device, a remote cache directory indicative of memory locations residing in a cache on a processor which shares access to some portion of a memory device. A memory request issued at the remote device may be routed to the processor cache if an address targeted by the memory request matches an entry in the remote cache directory. An entry in an outstanding transaction buffer residing on the remote device may be created, the entry containing the address targeted by the memory request routed to the processor cache.

Another embodiment provides a device configured to access data stored in memory and cacheable by a processor. The device generally includes one or more processing cores, a remote cache directory indicative of contents of a cache residing on the processor, a castout buffer indicating cache lines that have been or will be castout from the processor cache, and coherency logic. The coherency logic is generally configured to receive cache coherency information indicative of changes to the contents of the processor cache sent by the processor in bus transactions and update the cache directory and castout buffer based on the cache coherency information.

Another embodiment provides a coherent system generally including a processor and a remote device. The processor generally includes a cache for storing data accessed from external memory, a cache directory with entries indicating which memory locations are stored in cache lines of the cache and corresponding coherency states thereof, and control logic configured to detect internal bus transactions indicating the allocation and de-allocation of cache lines and, in response, generate bus transactions, each containing cache coherency information indicating cache line that has been allocated or de-allocated. The remote device generally includes a remote cache directory indicative of contents of the cache residing on the processor, a castout buffer indicating cache lines that have been or will be castout from the processor cache, and coherency logic configured to update the remote cache directory, based on cache coherency information contained in the external bus transactions generated by the processor control logic, to reflect allocated and de-allocated cache lines of the processor cache.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIGS. 4A and 4B illustrate exemplary bits/signals used for enhanced bus transactions used to maintain a remote cache directory, in accordance with embodiments of the present invention;

DETAILED DESCRIPTION OF THE PREFERRED EMBODIMENTS

Figure 1:
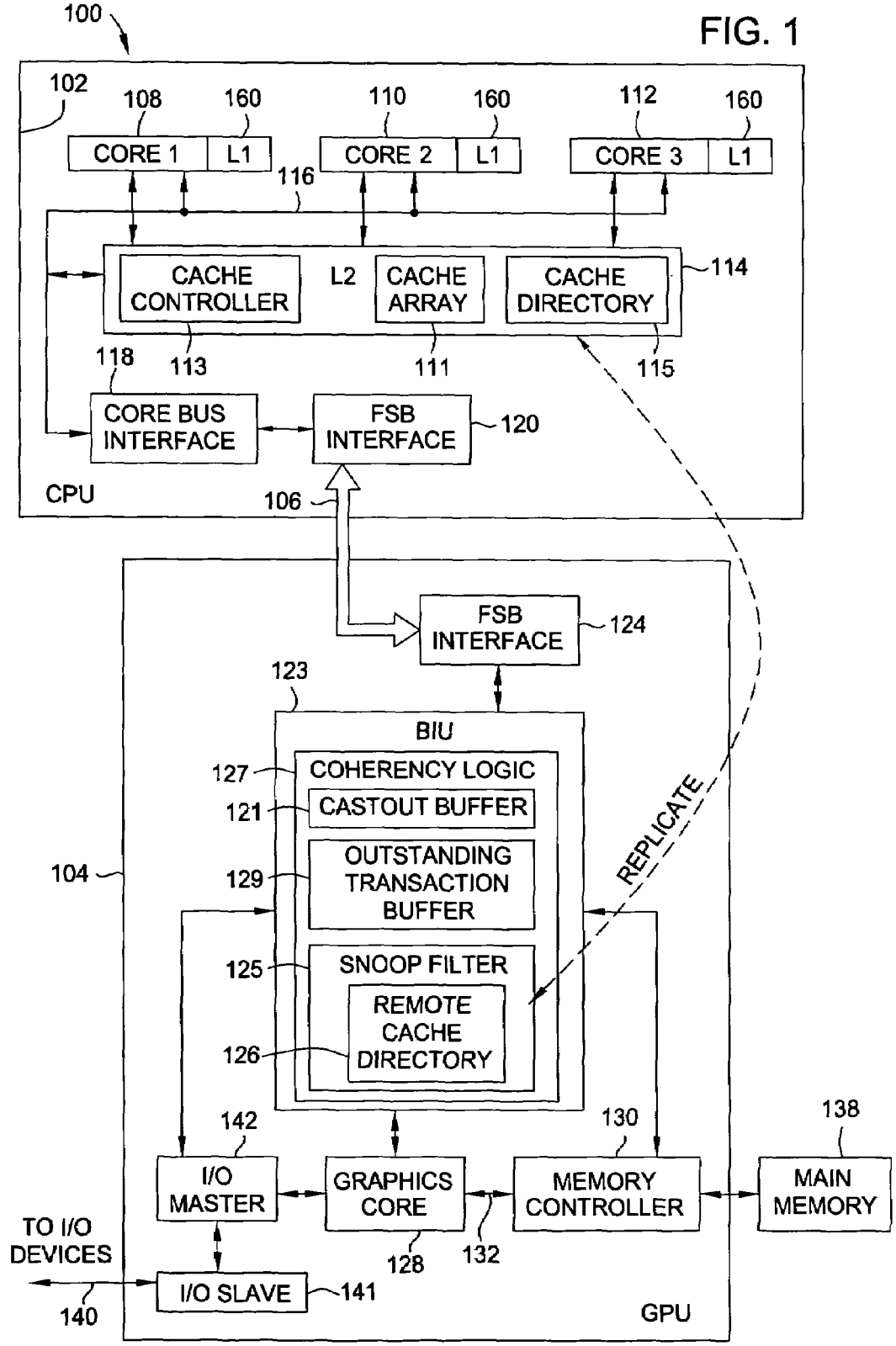
FIG. 1 illustrates an exemplary system in accordance with embodiments of the present invention.

Embodiments of the present invention generally provide methods and apparatus that may be utilized to maintain coherency of data accessed by both a processor and a remote device. For some embodiments, various mechanisms, such as a remote cache directory, castout buffer, and/or outstanding transaction buffer may be utilized by the remote device to track the state of processor cache lines that may hold data targeted by requests initiated by the remote device. Based on the content of these mechanisms, only those requests that target cache lines indicated to be valid in the processor cache may be routed to the processor, thus conserving bus bandwidth. Other requests targeting data that is not in the processor cache may be routed directly to memory, thus reducing overall latency.

As used herein, the term cache coherency refers to the generally desirable property that accessing a copy of data (a cache line) from a cache gives the same value as the underlying data, even when the data was modified by a different process after the data was first cached. Maintaining cache coherency is important for consistent operation of multiprocessor systems in which one or more processor has a non-shared cache used to cache portions of a memory area shared by multiple processors. As used herein, the term virtual channel generally a data path that carries both request and/or response information between components. Each virtual channel typically utilizes a different buffer, with a virtual channel number indicating which buffer a packet transferred on that virtual channel will use. Virtual channels are referred to as virtual because, while multiple virtual channels may utilize a single common physical interface (e.g., a bus), they appear and act as separate channels. Virtual channels may be implemented using various logic components (e.g., switches, multiplexors, etc.) utilized to route data, received over the common bus, from different sources to different destinations, in effect, as if there were separate physical channels between each source and destination. An advantage to utilizing virtual channels is that various processes utilizing the data streamed by the virtual channels may operate in parallel which may improve system performance (e.g., while one process is receiving/sending data over the bus, another process may be manipulating data and not need the bus).

In the following description, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and, unless explicitly present, are not considered elements or limitations of the appended claims.

An Exemplary System

FIG. 1 schematically illustrates an exemplary multi-processor system 100 in which a processor (illustratively, a CPU 102) and a remote processor device (illustratively, a GPU 104) both access a shared main memory 138. In the illustrated embodiment, main memory 138 is near the GPU 104 and is accessed by a memory controller 130 which, for some embodiments, is integrated with (i.e., located on) the GPU 104. The system 100 is merely one example of a type of system in which embodiments of the present invention may be utilized to maintain coherency of data accessed by multiple devices.

As shown, the CPU 102 and the GPU 104 communicate via a front side bus (FSB) 106. The CPU 102 illustratively includes a plurality of processor cores 108, 110, and 112 that perform tasks under the control of software. The processor cores may each include any number of different type function units including, but not limited to arithmetic logic units (ALUs), floating point units (FPUs), and single instruction multiple data (SIMD) units. Examples of CPUs utilizing multiple processor cores include the Power PC line of CPUs, available from IBM. Each individual core may have a corresponding L1 cache 160 and may communicate over a common bus 116 that connects to a core bus interface 118. For some embodiments, the individual cores may share an L2 (secondary) cache memory 114.

As illustrated, the L2 cache 114 may include a cache array 111, cache directory 115, and cache controller 113. For some embodiments, the L2 cache 114 may be an associative cache and the cache directory 114 may include entries indicating addresses of cache lines stored in each "way" of an associative set, as well as an indication of a coherency state of each line. For some embodiments, the L2 cache 114 may be operated in accordance with the MESI protocol (supporting Modified, Exclusive, Shared, and Invalid states), or some variant thereof. The core bus interface 118 communicates with the L2 cache memory 114, and carries data transferred into and out of the CPU 102 via the FSB 106, through a front-side bus interface 120.

The GPU 104 also includes a front-side bus interface 124 that connects to the FSB 106 and that is used to pass information between the GPU 104 and the CPU 102. The GPU 104 is a device capable of processing large amounts of data at very high speed using sophisticated data structures and processing techniques. To do so, the GPU 104 includes at least one graphics core 128 that processes data obtained from the CPU 102 or from main memory 138 via the memory controller 130. The memory controller 130 connects to the graphics front-side bus interface 124 via a bus interface unit (BIU) 123. Data passes between the graphics core 128 and the memory controller 130 over a wide parallel bus 132. The main memory 138 typically stores operating routines, application programs, and corresponding data that may be accessed by the CPU 102 and GPU 104.

For some embodiments, the GPU 104 may also include an I/O port 140 that connects to an I/O driver (master device) 142. The I/O driver 142 passes data to and from any number of external devices, such as a mouse, video joy stick, computer board, and display, via an I/O slave device 141. The I/O driver 142 properly formats data and passes data to and from the graphic front-side bus interface 124. That data is then passed to or from the CPU 102 or is used in the GPU 104, possibly being stored in the main memory 138 by way of the memory controller 130. As illustrated, the graphics cores 128, memory controller 130, and I/O driver 142 may all communicate with the BIU 123 that provides access to the FSB via the GPU's FSB interface 124.

As previously described, in conventional multi-processor systems, such as system 100, in which one or more remote devices request access to data for memory locations that are cached by a central processor, the remote devices often utilize some type of coherency logic to monitor (snoop) the contents of the processor cache. Typically, this snoop logic interrogates the processor cache directory for entries for every memory location the remote device wishes to access. As a result, conventional cache snooping may result in substantial latency and consume a significant amount of processor bus bandwidth.

Snoop Filter Directory Mechanism

Figure 2:
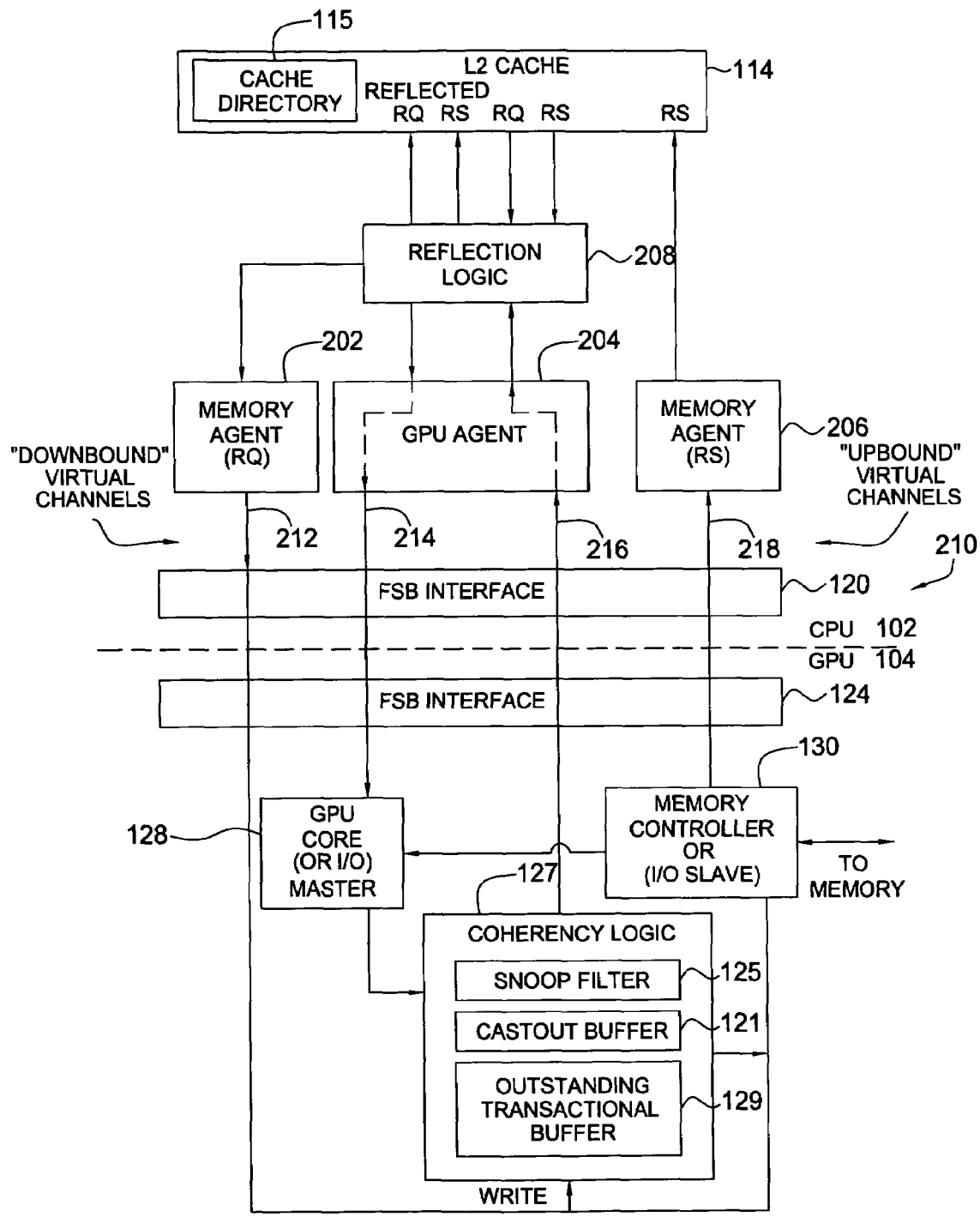
FIG. 2 illustrates an exemplary coherency (snoop) logic configuration, in accordance with embodiments of the present invention.

In an effort to reduce such latency and increase bus bandwidth, embodiments of the present invention may utilize coherency logic 127 on the remote device (in this example, the GPU 104), which may include a snoop filter 125, a castout buffer 121, and an outstanding transaction buffer 129. FIG. 2 illustrates a relational view of one system configuration utilizing these components to maintain coherency. As illustrated, the coherency logic 127 may be generally configured to route requests received by a GPU core 128 (or I/O master) to the CPU 102 or directly to memory, depending on the information contained in the snoop filter 125, castout buffer 121, and outstanding transaction buffer 129.

As will be described in greater detail below, the castout buffer 121 may be used to track the addresses of cache lines for which data is expected to be returned (in some cases castout) by the CPU 102. The outstanding transaction buffer 129 may be used to track addresses targeted by "in-flight" requests routed from the GPU 104 to the CPU 102, indicating data for these addresses may be expected.

As illustrated, the snoop filter 125 may maintain a remote cache directory 126 which provides, at the GPU 104, an indication of entries in the L2 cache directory 115 on the CPU 102. Accordingly, when a remote device attempts to access data in a memory location, the snoop filter 125 may check the remote cache directory 126 to determine if a modified copy of the data is cached at the CPU 102 without having to send bus commands to the CPU 102. As a result, the snoop filter 125 may "filter out" requests to access data that is not cached in the CPU 102 and route those requests directly to memory 138, via the memory controller 130, thus reducing latency and increasing bus bandwidth. As will be described in greater detail below, the snoop filter 125 may operate in concert with a cache controller 113 which may generate enhanced bus transactions containing cache coherency information used by the snoop filter 125 to update the remote cache directory 126 to reflect changes to the CPU cache directory 115.

Figure 6A:
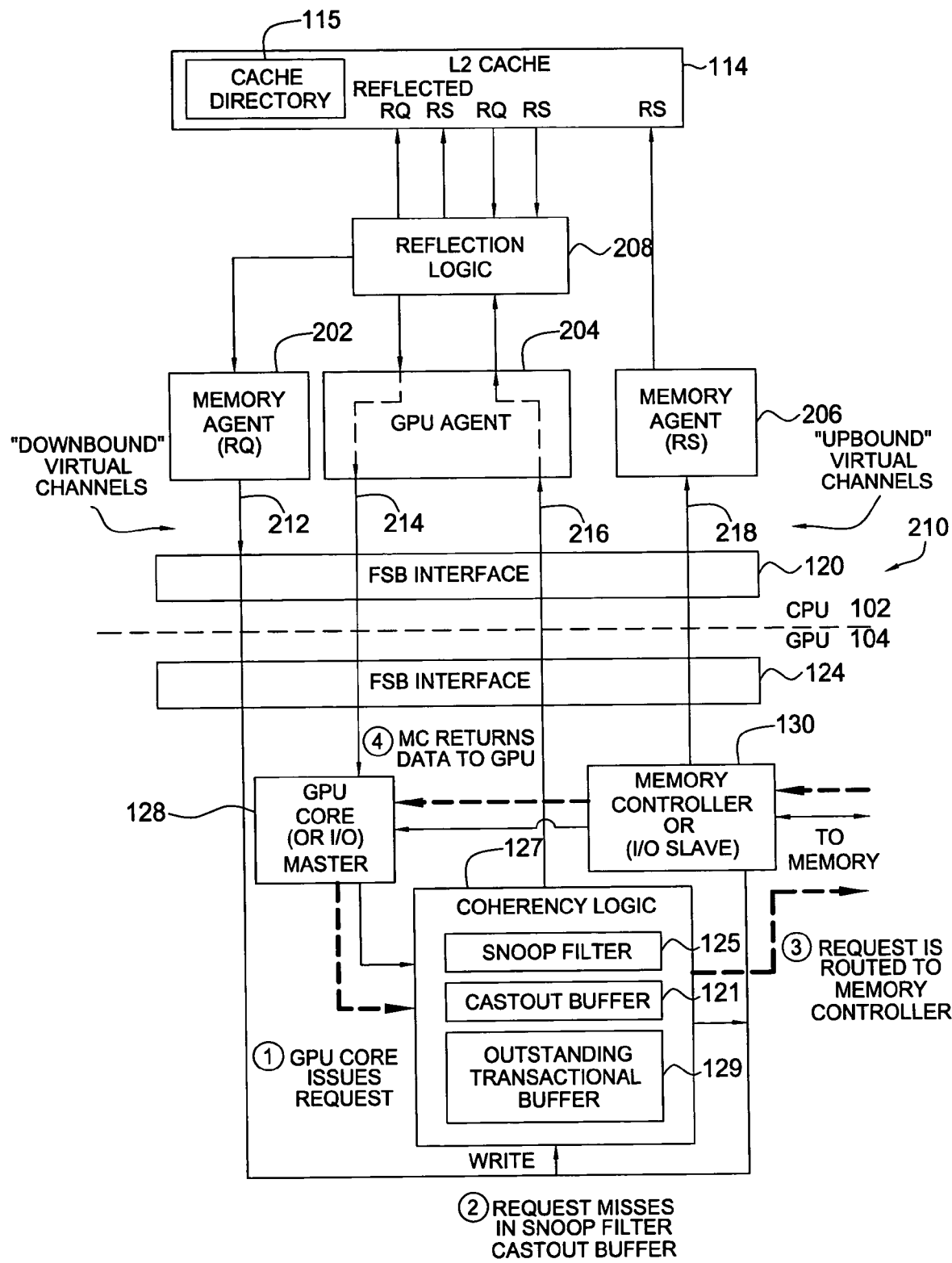
FIGS. 6A-6C illustrate exemplary data patjh diagrams for remote device memory access requests, in accordance with embodiments of the present invention.

As illustrated, the CPU 102 may include various components (that interface with the L2 cache controller and bus interface) to support system coherency and respond to requests received from the GPU 104. Such components may include memory agents 202 and 206 to route requests to and receive responses from, respectively, memory 138, as well as a GPU agent 204 to route requests to and receive responses from the GPU cores 128 (or I/O masters). These agents may communicate with the GPU 104 via virtual channels 210 established on the FSB. The virtual channels 210 include "upbound" virtual channels 216 and 218 to handle requests and responses, respectively, from the GPU 104 and "downbound" virtual channels 212 and 214 to handle requests and responses, respectively, from the CPU 102. Data paths through the virtual channels 210 for different transactions under different circumstances are described in detail below, with reference to FIGS. 6A-6C.

Figure 3:
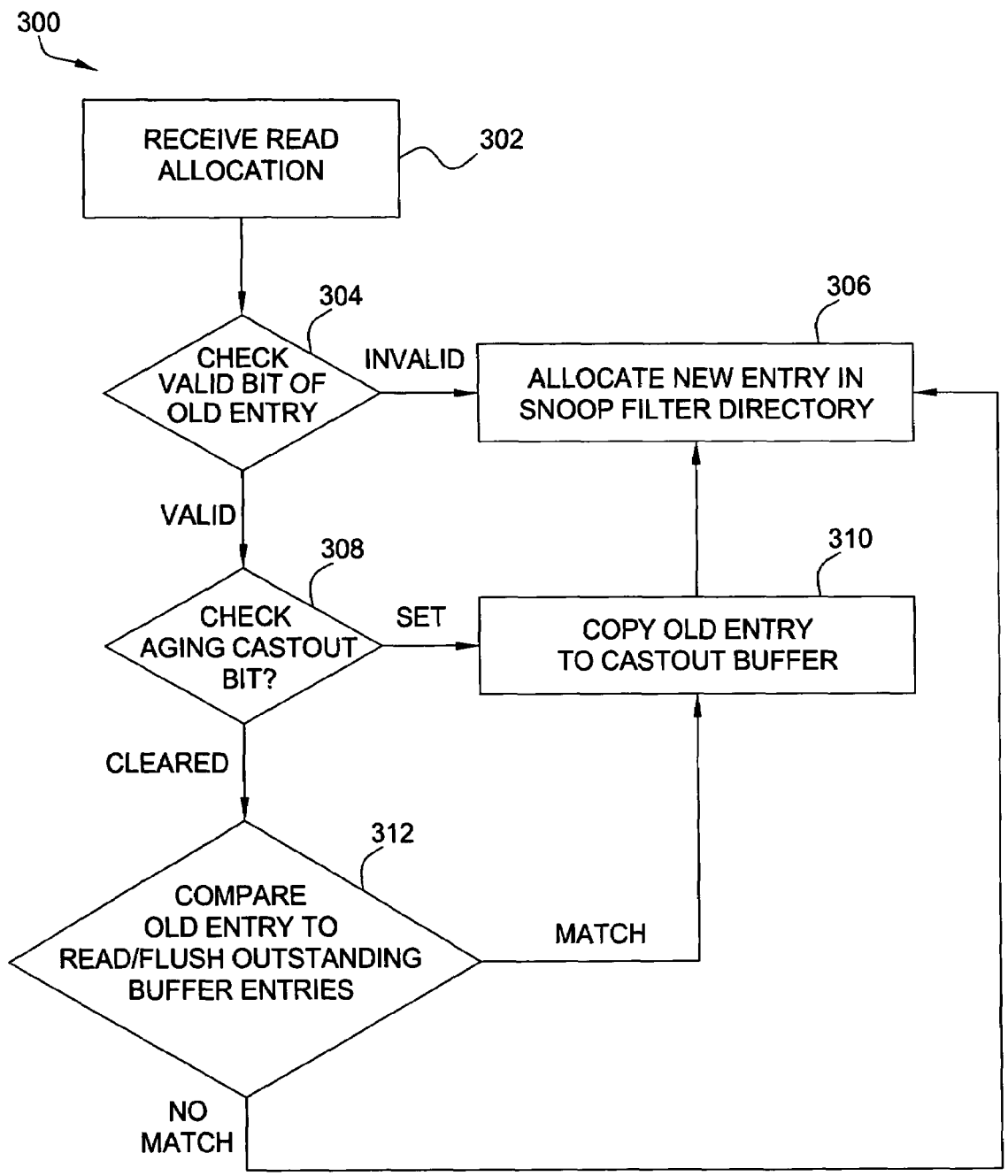
FIG. 3 is a flow diagram of exemplary operations for maintaining a remote cache directory and castout buffer, in accordance with embodiments of the present invention.

For some embodiments, the snoop filter 125 may monitor requests issued from the CPU 102 in an effort to ensure the remote cache directory 126 mirrors the CPU cache directory 115, and accurately reflects the contents and coherency state of the CPU cache 114. For example, FIG. 3 illustrates exemplary operations 300 that may be performed (e.g., by the snoop filter 125) to update the remote cache directory 126 based on requests issued by the CPU 102 indicating a new cache line is being allocated in the L2 cache 114.

The operations 300 begin, at step 302, by receiving a (read allocation) request from the CPU 102. In some cases, the request may be an enhanced bus transaction containing additional coherency information allowing the snoop filter to update the remote cache directory 126, as described in the commonly owned U.S. patent application entitled "Enhanced Bus Transactions for Efficient Support of a Remote Cache Directory Copy" (Ser. No. 10/961,742). This information may include an indication that an allocation or de-allocation transaction occurred and, if so, a particular cache line (e.g., a "way" within an associative set) that is being replaced. The information may also include an indication of whether an aging castout was or will be generated (i.e., resulting in modified data being written back to memory). These bus transactions may be considered enhanced because this additional coherency information may be added to information already included in a bus transaction occurring naturally. For example, a cache line allocation may naturally precede a bus transaction to read requested data to fill the allocated cache line.

Figure 5:
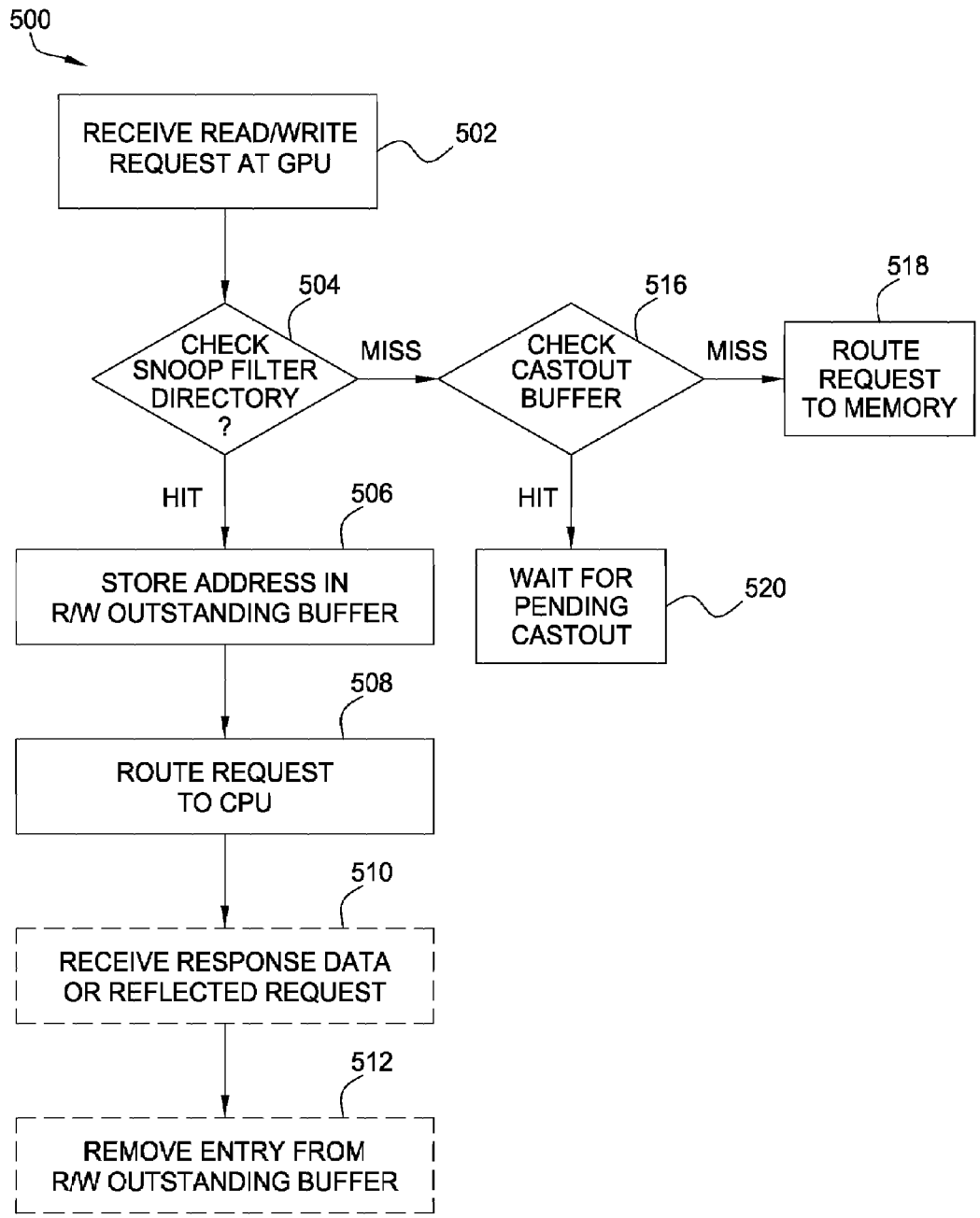
FIG. 5 is a flow diagram of exemplary operations for routing remote device memory access requests, in accordance with embodiments of the present invention.

At step 304, a valid bit of the old entry in the remote cache directory 126 (being replaced by the new entry) is examined. If the old entry is invalid, the new entry is allocated in the remote cache directory 126, at step 306. If the old entry is valid, however, a bit provided in the allocation request is examined to determine if the cached entry being replaced is to be castout, at step 308. If so, the GPU 104 can expect this data to be transferred (castout) from the CPU, and the old entry is copied to the castout buffer 121, at step 310. Thus, when the GPU 104 requests data, the castout buffer 121 may be examined to determine if a castout is pending (as shown in FIG. 5).

Even if the aging bit is not set, a castout (or other transfer) of the cacheline may still be pending, if the cacheline was targeted by an outstanding read or flush issued by the GPU 104. To determine if such requests are pending, the old entry (being replaced by the new allocation) may be compared against entries in the read/flush outstanding buffer, at step 312. A match indicates there is an outstanding read/flush request targeting the cacheline and, hence, the old entry is copied into the castout buffer 121, at step 310, prior to allocating the new entry in the remote directory (step 306). A mismatch indicates there is no such outstanding request, and the new entry is allocated, without copying the old entry into the castout buffer 121.

As described in the above-referenced application, similar operations to those shown in FIG. 3 may be performed to update the remote cache directory and castout buffer based on de-allocation information provided by the CPU 102. As with the allocation information, de-allocation information may also be contained in enhanced bus transactions. FIGS. 4A and 4B summarize the type of coherency information provided upon allocation and de-allocation, respectively.

As illustrated in FIG. 4A, for some embodiments, the coherency information may include a valid bit (rc_way_alloc_v) indicating whether or not a new entry is being allocated, set_id bits (rc_way_alloc[0:N]) indicating the way of the cache line being allocated, and an aging bit (rc_aging) indicating whether an aging castout (e.g., of a modified cache line) is being issued. If the valid bit is inactive, the remaining bits may be ignored, since a new entry is not being allocated (e.g., a cache line for a targeted memory location already exists in L2 cache). In other words, the coherency information may be sent with each such transaction, even when a new line is not being allocated, to avoid having separate transactions for transferring coherency information. In such embodiments, the GPU 104 may quickly check the valid bit to determine if a new cache line is being allocated.

If the valid bit is set, the set_id bits may be examined to determine which cache line of an associate set is being allocated. For example, for a 4-way associate cache (N=1), a two bit set_id may indicate one of 4 available cache lines, for an 8-way associative cache (N=2), a 3-bit set_id may indicate one of 8 available cache lines, and so on. As an alternative, individual bits (or signals) for each of the ways of the set may be used which, in some cases, may provide improved timing.

The aging bit set indicates an aging castout is being issued, for example, since the coherency state of the aging L2 cache line is modified (M). The aging bit cleared indicates that the entry being replaced is not being castout, for example, because the aging L2 entry was invalid (I), shared (S), or exclusive (E), and can be overwritten with this new allocation.

It should be noted that, in some cases, the remote cache directory 126 may indicate more valid cache lines are in the L2 cache 114 than are indicated by the CPU cache directory 115 (e.g., the valid cache lines indicated by the remote cache directory may represent a superset of the actual valid cache lines). This is because cache lines in the L2 cache 114 may transition from Exclusive (E) or Shared (S) to Invalid (I) without any corresponding bus operations to signal these transitions. While this may result in occasional additional requests sent from the GPU 104 to the CPU 102 (the CPU 102 can respond that its copy is invalid), it is also a safe approach aimed at ensuring the CPU is always checked if the remote cache directory 126 indicates requested data is cached. As will be described in greater detail below, these requests may be "reflected" back to the GPU to be routed to memory.

When L2 cache lines are de-allocated (e.g., due to a write with kill), enhanced bus transactions containing coherency information related to the de-allocation may also be generated. This coherency information may include an indication an entry is being de-allocated and the set_id (way) indicating which cache line within an associative set being de-allocated. This information may be generated by "push snoop logic" in the L2 cache 114 and carried in a set of control bits/signals, as with the previously described coherency information transmitted upon cache line allocation. This coherency information will be used by the GPU snoop filter 125 to correctly invalidate the corresponding entry in the (L2 superset) remote cache directory 126. As illustrated in FIG. 4B, the coherency information related to the de-allocation may be carried in similar bits/signals (valid and set_id) to those related to allocation shown in FIG. 4A. As the de-allocation assumes a castout, there may be no need for an aging bit.

Routing Remote Device Memory Requests

FIG. 5 is a flow diagram of exemplary operations 500 for routing remote device memory access requests based on information maintained in the remote cache (snoop filter) directory 126 and castout buffer 121, in accordance with embodiments of the present invention. While the operations are described with reference to requests issued by a GPU (core), it should be understood the same or similar operations may be performed to route requests from any requesting entity.

The operations 500 begin, at step 502, by receiving a request from the GPU 104. At step 504, the snoop filter directory 126 is checked in an effort to determine if a cache line containing data targeted by the request is in the L2 cache 114 of the CPU 102. A hit (an entry with a matching entry and valid state) indicates a targeted cache line is in the L2 cache 114, while a miss indicates one is not. However, even in the event of a miss, it is possible that a castout of a recently cached line is pending and modified data may be written back to memory. Therefore, the castout buffer is checked, at step 516, for an indication a castout of a targeted cache line is pending. If a castout is pending, there is a risk that stale data might be read from memory if the request is issued before the modified data is written back to memory, so the GPU waits for the pending castout, at step 520.

If there is no castout pending, the request is routed to memory, at step 518. In other words, by maintaining coherency information in the snoop cache directory 126 and castout buffer 121, the request may be issued directly against memory, without having to send any time consuming snoop requests to the CPU. This scenario is illustrated in the exemplary data path diagram of FIG. 6A, in which various events are enumerated (1-4). First, a GPU core issues a request (1). Second, the request misses in the snoop filter directory 126 and castout buffer 121 (2), indicating a targeted cache line does not presently reside in the L2 cache 114. Accordingly, the request is routed to memory, via the memory controller 130 (3). Finally, the memory controller 130 returns the requested data to the GPU core (4).

Referring back to FIG. 5, a check of the snoop filter directory, at step 504, resulting in a hit indicates a cache line containing data targeted by the request is in the L2 cache 114. According to some embodiments, of the present invention, the coherency logic 127 may send a request to tell the CPU 102 to invalidate its cached copy of the targeted memory location (if the copy was not modified) or cast out its copy (if it was modified). To track these pending operations, and handle subsequent accesses targeting the same memory locations, a copy of the targeted address is stored in the read/write outstanding buffer 129, at step 506. At step 508, a request to invalidate/castout its copy is routed to the CPU 102. Depending on the state of the targeted data, the CPU may respond with data (if castout) or at least some type of response indicating the request was processed. Therefore, at step 510, the GPU 104 may receive response data or a reflected read (described in greater detail below). At step 512, the entry from the read/write outstanding buffer 129 may be removed.

Figure 6B:
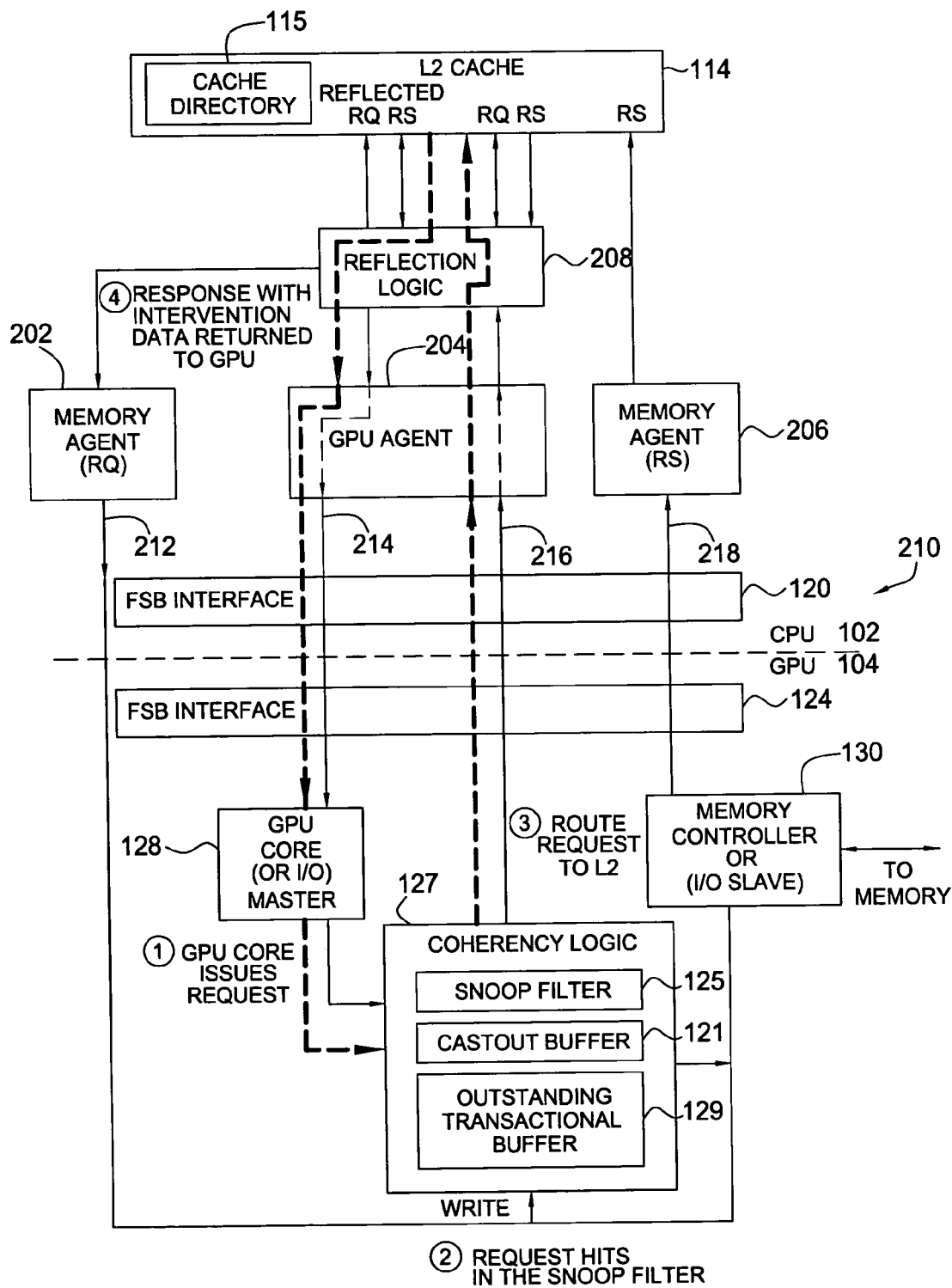
Figure 6C:
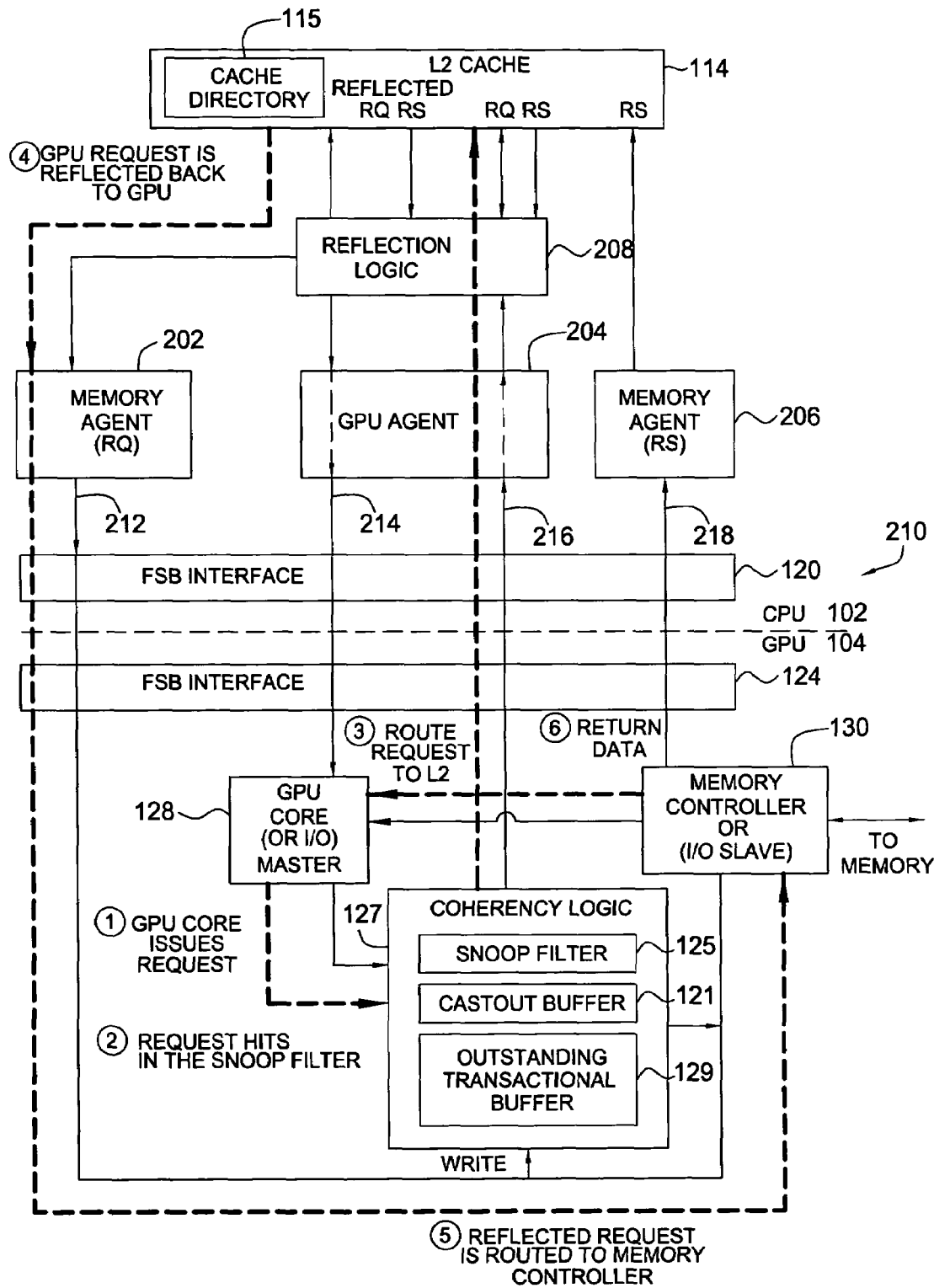

Data paths for requests that hit in the snoop filter directory 126 are illustrated in FIGS. 6B and 6C, in which various events are again enumerated. FIG. 6B illustrates the routing of a request for data that is cached in the L2 114 in a valid state, and returned from the CPU directly to a requesting GPU core. First, a GPU core issues a request (1). Second, the request hits in the snoop filter directory 126, indicating a targeted cache line resides in the L2 cache 114. Accordingly, the request is routed to the L2 114 (3). For some embodiments, and in some instances, the L2 114 logic may respond by sending a response with the requested data directly to the GPU core (4).

This approach may reduce latency by eliminating the need for the GPU core to generate a separate response to read the requested memory. In some cases, if the data has been modified, it may be marked as dirty in the response, causing the GPU 104 to generate a write to memory. In some cases, however, the GPU 104 may access a special set of registers, referred to as a lock set, that does not require backing to memory (e.g., the GPU reads, but never writes to these registers). The concepts of utilizing such a lock set are described in detail in the commonly owned application, entitled "Direct Access of Cache Lock Set Data Without Backing Memory" (Ser. No. 10/961,752), filed herewith.

FIG. 6C illustrates the routing of a request for data that results in a hit with the remote cache directory 126 but the data is not cached in the L2 in a valid state. In such cases, the L2 cache may return NULL data, causing reflection logic 208 in the CPU 102 to respond with what may be referred to as "reflected" read (or write) requests that are, in effect requests reflected back to the GPU 104 to be routed to the memory controller 130 for execution against memory (e.g., on behalf of the requesting GPU core 128).

Figure 7:
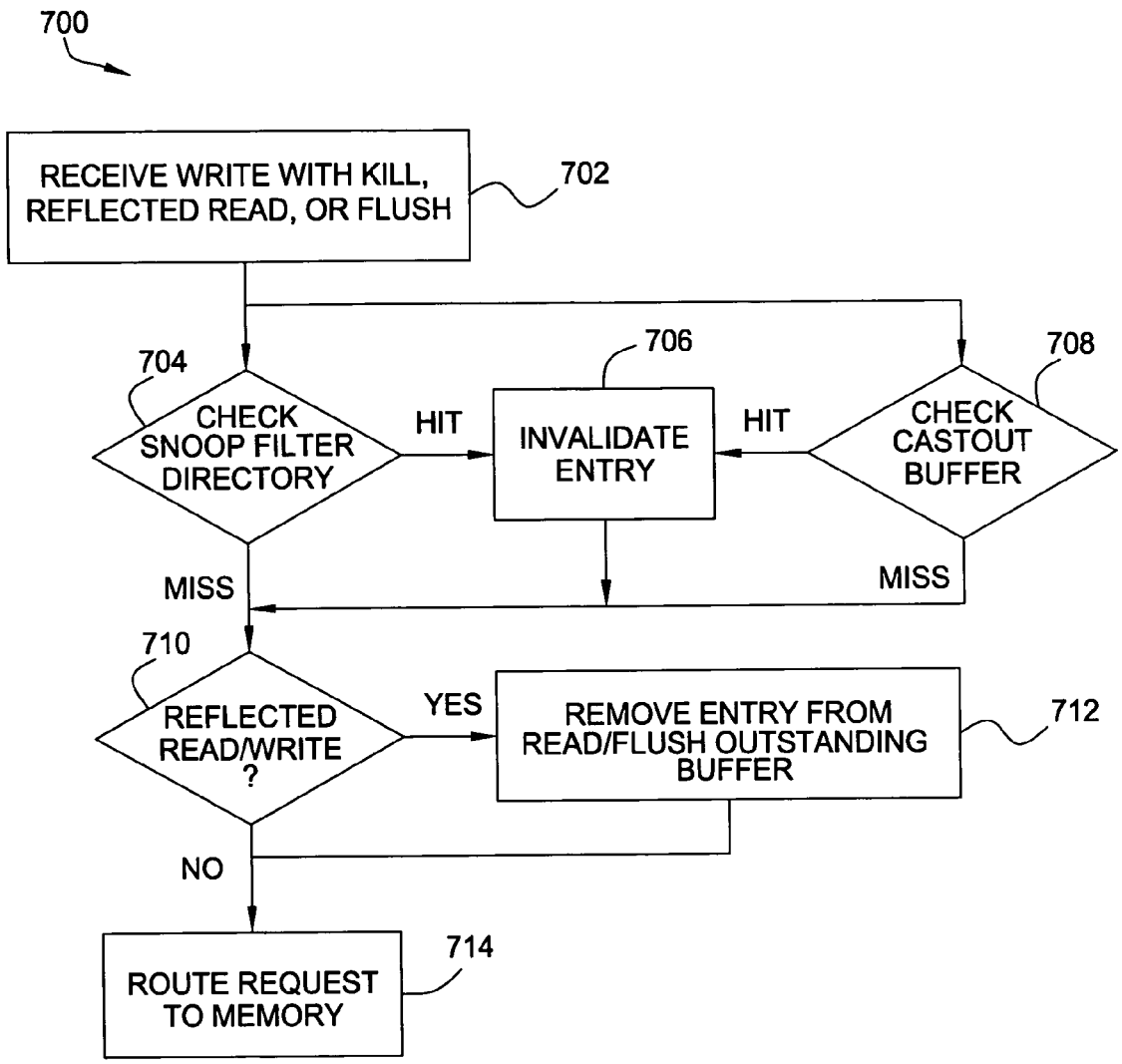
FIG. 7 is a flow diagram of exemplary operations for routing remote device memory access requests, in accordance with embodiments of the present invention.

FIG. 7 is a flow diagram of exemplary operations 700 for updating the snoop filter directory 126, castout buffer 121, and/or read/write outstanding buffer 129, in response to certain requests received from the CPU 102. The operations 700 begin, at step 702, by receiving such a request from the CPU 102. As illustrated, for some embodiments, requests that cause a change to these coherency mechanisms may include a write with kill, or a reflected read or write.

If the request hits in the remote cache (snoop filter) directory 126, as determined at step 704, the entry that resulted in the hit is invalidated, at step 706. This is because a write with kill indicates the corresponding data in the L2 cache is being written out, and a reflected read or write request indicates the data in the L2 cache is no longer valid. As illustrated, the castout buffer 121 may be checked in parallel, at step 708, with the remote cache directory 126. A hit also results in the corresponding entry being invalidated, at step 706. If the request received from the CPU is a reflected read or write, as determined at step 710, the corresponding entry is removed from the outstanding transaction buffer 129, at step 712. Removing the entry (that was created when the coherency logic routed the request resulting in the reflected read/write request to the L2, per step 506 of FIG. 5) is done because the request is no longer "in flight." The request is then routed to memory, at step 714.

CONCLUSION

Coherency support structures (e.g., a remote cache directory, castout buffer, and outstanding transaction buffer) on a remote device may be used to indicate the contents of an L2 cache of a processor that shares memory with the remote device and to indicate the status requests targeting data stored in the L2 cache. Accordingly, the mechanisms may be checked at the remote device to determine whether to route a memory request to the L2 cache or directly to memory, which may result in significant reductions in latency. These mechanisms may be updated by monitoring memory access requests issued by the processor, as well as the remote device, avoiding unnecessary snoop requests.

While the foregoing is directed to embodiments of the present invention, other and further embodiments of the invention may be devised without departing from the basic scope thereof, and the scope thereof is determined by the claims that follow.

What is claimed is:

1. A method of maintaining coherency of data accessed by a remote device, comprising:
   maintaining, on the remote device:
   a remote cache directory indicative of memory locations residing in a processor cache on a processor which shares access to some portion of a memory device, wherein maintaining the remote cache directory comprises:
   receiving, by the remote device, a bus transaction initiated by the processor containing cache coherency information indicating a change to a processor cache directory residing on the processor; and
   updating the remote cache directory, based on the cache coherency information, to reflect the change to the processor cache directory;
   a castout buffer indicating cache lines that have been castout from the processor cache, wherein maintaining the castout buffer comprises:
   copying an entry from the remote cache directory to the castout buffer if the cache coherency information indicates an aging castout is to occur at the processor; and
   copying an entry from an outstanding transaction buffer to the castout buffer in response to detecting a match between an address of a cache line being castout and the entry;
   routing a memory request issued at the remote device to the processor cache if an address targeted by the memory request matches an entry in the remote cache directory; and
   creating an entry in the outstanding transaction buffer residing on the remote device, the entry containing the address targeted by the memory request routed to the processor cache.

2. The method of claim 1, further comprising removing the entry from the outstanding transaction buffer upon receiving response data from the processor cache.

3. The method of claim 1, further comprising routing the memory request to the memory device if a match between an address targeted by the memory request and entries in the remote cache directory and castout buffer are not found.

4. A coherent system, comprising:
   a processor having:
   a processor cache for storing data accessed from external memory;

a cache directory with entries indicating which memory locations are stored in cache lines of the processor cache and corresponding coherency states thereof; and processor control logic configured to:
- detect internal bus transactions indicating an allocation or de-allocation of cache lines and, in response, generate external bus transactions, each containing cache coherency information indicating a cache line that has been allocated or de-allocated;
- receive a memory access request issued by a graphics processing core;
- search a remote cache directory and castout buffer for entries matching an address targeted by the memory access request;
- if no matching entries are found, route the memory access request to external memory without sending the memory access request to the processor;
- if a matching entry is found, route the memory access request to the processor;
- create an entry in an outstanding transaction buffer containing the address targeted by the memory access request; and
- copy an entry from the outstanding transaction buffer to the castout buffer, in response to receiving coherency information from the processor indicating a corresponding cache line has been or will be cast out from the processor cache; and a remote device having:
- the remote cache directory indicative of contents of the processor cache;
- the castout buffer indicating cache lines that have been or will be castout from the processor cache; and
- coherency logic configured to update the remote cache directory, based on the cache coherency information contained in the external bus transactions generated by the processor control logic, to reflect allocated and de-allocated cache lines of the processor cache.

5. The system of claim 4, wherein the remote device is a graphics processing unit (GPU) including one or more graphics processing cores.

* * * * *